United States Patent
Walker et al.

(10) Patent No.: US 11,994,642 B2
(45) Date of Patent: May 28, 2024

(54) METHOD AND APPARATUS FOR GEOPHYSICAL FORMATION EVALUATION MEASUREMENTS BEHIND CASING

(71) Applicant: HALLIBURTON ENERGY SERVICES, INC., Houston, TX (US)

(72) Inventors: Kristoffer Thomas Walker, Kingwood, TX (US); John Philip Granville, Humble, TX (US); Chung Chang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 249 days.

(21) Appl. No.: 17/628,611

(22) PCT Filed: Aug. 30, 2019

(86) PCT No.: PCT/US2019/049207
§ 371 (c)(1),
(2) Date: Jan. 20, 2022

(87) PCT Pub. No.: WO2021/040746
PCT Pub. Date: Mar. 4, 2021

(65) Prior Publication Data
US 2022/0268959 A1    Aug. 25, 2022

(51) Int. Cl.
*G01V 1/50*    (2006.01)
*E21B 47/005*    (2012.01)
(Continued)

(52) U.S. Cl.
CPC .............. *G01V 1/50* (2013.01); *E21B 47/005* (2020.05); *E21B 49/00* (2013.01); *G01V 1/46* (2013.01);
(Continued)

(58) Field of Classification Search
CPC ... G01V 1/50; G01V 1/46; G01V 1/52; G01V 2210/1299; G01V 2210/1425;
(Continued)

(56) References Cited

U.S. PATENT DOCUMENTS 6,483,777 B1    11/2002    Zeroug
7,149,146 B2 *    12/2006    Kuijk .................... E21B 47/005
                                                         181/105

(Continued)

FOREIGN PATENT DOCUMENTS

WO    2016187240 A1    11/2016

OTHER PUBLICATIONS

International Search Report and Written Opinion for International application No. PCT/US2019/049207, mailed May 28, 2020, 11 pages.

*Primary Examiner* — Mohamed Charioui
*Assistant Examiner* — Christine Y Liao
(74) *Attorney, Agent, or Firm* — NOVAK DRUCE CARROLL LLP

(57) ABSTRACT

Apparatus, methods, and systems for determining acoustic velocity behind casing or tubing in a subterranean wellbore. A method may include obtaining a plurality of waveform data sets corresponding to a plurality of propagation path regimes and obtaining a total wavefield across the receiver array. The method may also include determining a Green's function representing each of the plurality of propagation path regimes and determining a noise wavefield by convolving the Green's functions and a known transmitted pressure signal corresponding to the plurality of waveform data sets. The method may also include generating a reduced-noise wavefield by subtracting the noise wavefield from the total wavefield and estimating the acoustic velocity of a formation behind the casing or tubing from the reduce-noise wavefield.

20 Claims, 9 Drawing Sheets

(51) Int. Cl.
*E21B 49/00* (2006.01)
*G01V 1/46* (2006.01)
*G01V 1/52* (2006.01)

(52) U.S. Cl.
CPC ........ *G01V 1/52* (2013.01); *G01V 2210/1299* (2013.01); *G01V 2210/1425* (2013.01); *G01V 2210/1429* (2013.01); *G01V 2210/32* (2013.01)

(58) Field of Classification Search
CPC ........ G01V 2210/1429; G01V 2210/32; E21B 47/005; E21B 49/00
See application file for complete search history.

(56) References Cited

U.S. PATENT DOCUMENTS

| | | |
|---|---|---|
| 7,522,471 B2 | 4/2009 | Froelich et al. |
| 7,675,817 B2 | 3/2010 | Moos |
| 8,116,167 B2 | 2/2012 | Johnson et al. |
| 8,289,808 B2 | 10/2012 | Vu et al. |
| 8,522,611 B2 | 9/2013 | Frumin et al. |
| 8,559,269 B2 | 10/2013 | Vu et al. |
| 9,103,944 B2 | 8/2015 | Vu et al. |
| 9,829,597 B2 | 11/2017 | Zeroug et al. |
| 2016/0109605 A1 | 4/2016 | Bose et al. |
| 2016/0363681 A1* | 12/2016 | Boiero .................. G01V 1/282 |
| 2017/0176621 A1 | 6/2017 | Valero et al. |
| 2019/0187313 A1 | 6/2019 | Chemingui et al. |

\* cited by examiner

| Tubing | Annulus A | Annulus B | |
|--------|-----------|-----------|-----------|
| Water | Water | Water | Formation |

FIG. 8A

| Tubing | Annulus A | Annulus B | |
|--------|-----------|-----------|-----------|
| Water | Water | Cement | Formation |

FIG. 8B

METHOD AND APPARATUS FOR GEOPHYSICAL FORMATION EVALUATION MEASUREMENTS BEHIND CASING

CROSS-REFERENCE TO RELATED APPLICATIONS

This application is a national stage entry of PCT/US2019/049207 filed Aug. 30, 2019, said application is expressly incorporated herein in its entirety.

FIELD

The present disclosure relates to improved sonic logging methods in subterranean wellbores. In particular, the present disclosure relates to acoustic devices, methods, and systems, for through casing formation evaluation or cement evaluation.

BACKGROUND

Wellbores are drilled into the earth for a variety of purposes including tapping into hydrocarbon bearing formations to extract the hydrocarbons for use as fuel, lubricants, chemical production, and other purposes. After a wellbore has been drilled, the wellbore is often cased by inserting lengths of steel pipe connected end-to-end into the wellbore to form a casing string consisting of casing sections with connecting collars that extend from the surface to a desired depth of the wellbore. The casing string is then cemented in place to complete the casing operation. The casing string increases the integrity of the wellbore, reduces contamination of non-produced formations with wellbore fluids, and provides a path for producing fluids from the producing intervals to the surface.

Measuring rock and reservoir properties in a formation beyond the casing is desirable to wellbore operators. Of particular interest are non-invasive methods to reliably estimate properties such as compressional and shear velocity of the formation beyond the casing in completed oil and gas wells. Seismic velocity measurements may be used for estimating various formation properties, such as rock strength, porosity, lithology, and pore pressure. For example, rock strength may be quantified using stiffness moduli which are the products of the different velocities squared and density. Stiffness moduli are important parameters for drilling and production engineering since strong rocks are much more difficult to drill or perforate than weaker rocks.

Porosity is critically important for identifying and estimating the productivity of a conventional reservoir. For instance, porosity measurements are a major decision factor in determining which reservoirs to produce first. Lithology is also important because there are large differences in productivity between different types of reservoirs. Lithologic identification along with knowledge of the locations of source rock and traps from seismic data helps geologists determine the optimum reservoir targets for production.

Determining the pore pressure of a formation is important for several reasons. First, depletion of a reservoir reduces pore pressure, which creates shear and compressional stresses on the casing that can result in catastrophic failure and borehole stability problems. Therefore, it may be important to monitor changes in pore pressure around a cased hole over the lifetime of the well to maximize the well's life time by taking steps to mitigate growing risks. Secondly, measuring pore pressure is useful in a producing well since such pore pressure directly affects production. For example, injection operations may be altered in a secondary recovery well depending on the local pore pressure surrounding a production well. Thirdly, it may be useful to know what the pore pressure is behind casing to predict which previously bypassed hydrocarbon reservoir interval would be the most productive to perforate and produce. Lastly, measuring pore pressure behind casing is useful to access when a producing perforation has become blocked. In such a case, the pore pressure in the formation will rise. However, if the interval has been completely drained, the pore pressure will be lower.

The remote measurement of seismic velocity behind one or multiple layers of tubing and casing is challenging due to the interference of guided, dispersive waves from the casing or waveguides in between casing layers. These interfering waves are large in amplitude compared to the weaker arrivals of interest which carry the seismic velocity information about the formation properties. One can perforate the casing or tubing, take a measurement, and then patch the perforation. However, this is time consuming and modifies the structural integrity of the casing, which may be problematic under certain conditions. One can also measure the strain in the casing itself using fiber optic technologies, but including such fibers when the casing is installed is not always an option, and many cased holes already exist without such fibers. Non-invasive methods, systems, and apparatus for making behind casing pore measurements are desirable.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8A depicts the wellbore scenario in which formation velocities may be measured through tubing and three strings of casing where there is no cement according to the presently disclosed methods, according to an exemplary embodiment of the present disclosure; and FIG. 8B depicts the wellbore scenario in which formation velocities may be measured through tubing and three strings of casing where there is cement in outer "Annulus B" according to the presently disclosed methods, according to an exemplary embodiment of the present disclosure.

DETAILED DESCRIPTION

Figure 1:
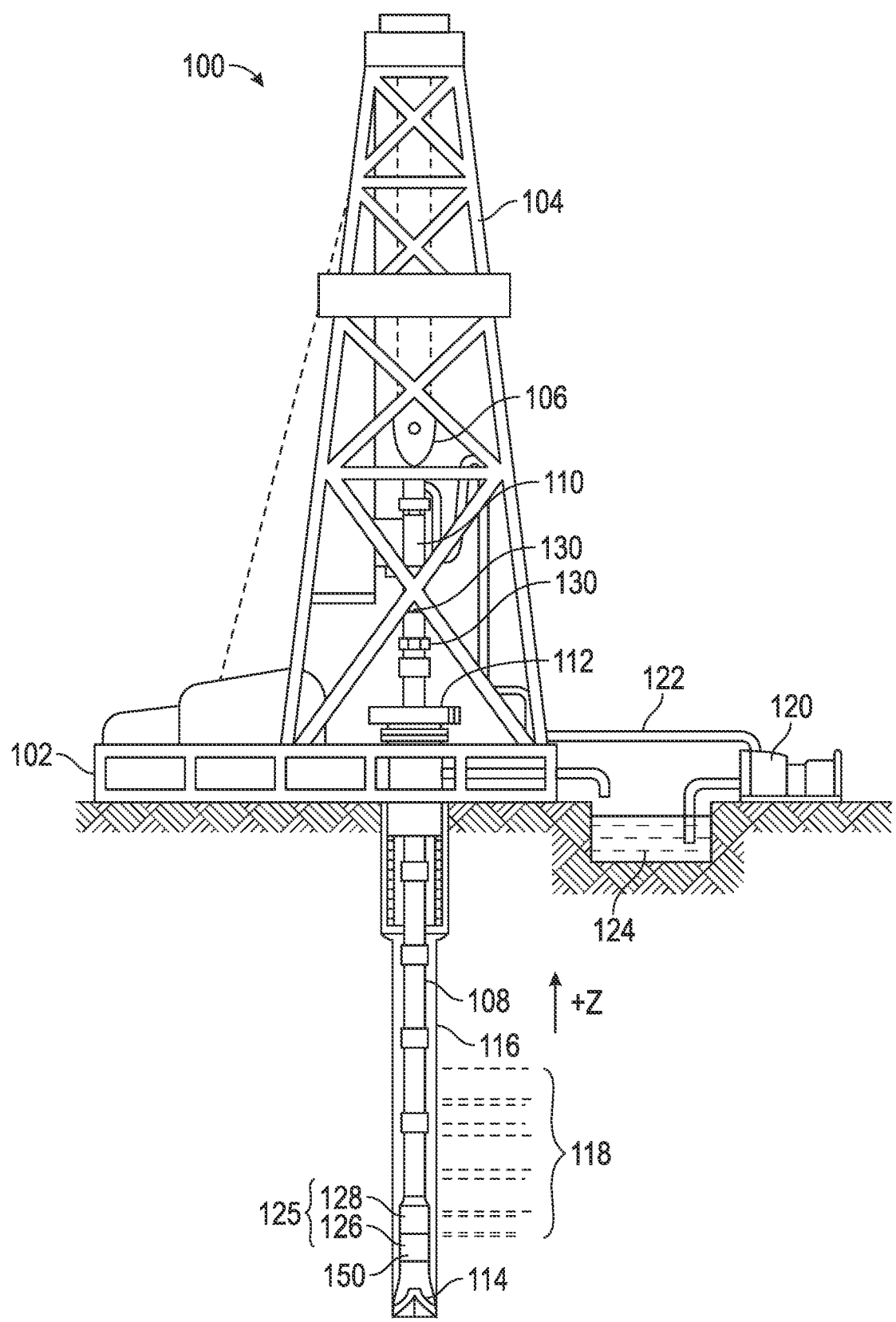
FIG. 1 is a diagram of a logging while drilling (LWD) or measurement while drilling (MWD) wellbore operating environment in which the presently disclosed apparatus, method, and system may be deployed, according to an exemplary embodiment of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

The present disclosure provides methods, systems, and apparatus for measuring seismic velocity behind casing and tubing by using a directional acoustic or ultrasonic source coupled with data processing methods to remove the interfering noise and preserve the signals of interest.

According to at least one aspect of the present disclosure a method of determining acoustic velocity behind casing or tubing in a subterranean wellbore is provided. The method may include using an acoustic logging tool and a plurality of waveform data sets at a wellbore depth corresponding to a target subterranean formation zone. The plurality of waveform data sets may include, for example, a first waveform data set corresponding to a first propagation path regime and a second waveform data set corresponding to a second propagation path regime. The acoustic logging tool may include, for example, one or more acoustic or ultrasonic transmitters configured to sample different propagation paths between the transmitter source and an array of acoustic receivers. The method may further include obtaining a total wavefield across the receiver array of the acoustic logging tool at the wellbore depth and determining a Green's function representing each of the first propagation path regime and the second propagation path regime. In at least some instances, the Green's functions may be determined by deconvolving a known transmitted pressure signal from the recording of the first waveform data set and the second waveform data set.

The method may further include determining a noise wavefield by convolving the Green's functions and a known transmitted pressure signal corresponding to the first waveform data set and the second waveform data set. The method may further include generating a reduced-noise wavefield by subtracting the noise wavefield from the total wavefield. The reduced-noise wavefield may correspond to a wavefield associated with the refracted compressional wave transiting the target subterranean formation zone. The method may further include estimating the formation compressional wave speed for the target subterranean formation zone using the reduced-noise wavefield.

In some instances, the first propagation path regime may be a high-angle of incidence regime and the second propagation path regime may be a low-angle of incidence regime. In such instances, the acoustic logging tool may include a first low-incidence angle directional acoustic transmitter configured to transmit a source waveform such that it impacts the casing or tubing at a low-incidence angle and a second high-incidence angle direction acoustic transmitter configured to transmit a source waveform such that it impacts the casing or tubing at a high-incidence angle. The obtaining a total wavefield in the method may include in such cases firing the first low-incidence angle directional acoustic transmitter and the second high-incidence angle directional acoustic transmitter simultaneously.

The method may also include firing simultaneously the first low-incidence angle directional acoustic transmitter and the second high-incidence angle directional acoustic transmitter using a short impulse drive pulse to obtain a total wavefield. The method may further include firing the second high-incidence angle directional acoustic transmitter using a longer drive pulse to obtain a second waveform data set corresponding to the high-angle of incidence regime. In such instances, the determining of the Green's functions may include applying deconvolution to the second waveform data set.

The acoustic logging tool used in the method may include an ultrasonic transmitter configured to transmit a source wave at ultrasonic frequencies greater than about 20 KHz. In other cases, the acoustic logging tool may include a broadband transmitter configured to transmit a source wave at acoustic frequencies of from about 20 Hz to about 20 KHz and ultrasonic frequencies greater than 20 KHz. In other instances, the a plurality of waveform data sets and the total wavefield are obtained using a logging tool having a transmitter configured to transmit in the ultrasonic frequency range of from about 50 kHz to about 200 kHz. In some instances, the acoustic logging tool may include a narrow-beam transmitter configured to perform a sweep of firings through a range of incidence angles.

According to one aspect of the present disclosure, the method may further include providing an acoustic logging tool in a subterranean wellbore comprising casing or tubing. In such cases, the method may also include lowering the acoustic logging tool to a wellbore depth corresponding to a cased portion of the wellbore or adjacent to tubing. The method may also include disposing an acoustic logging tool in a subterranean wellbore comprising casing or tubing, the acoustic logging tool having a receiver array and one or more directional acoustic or ultrasonic transmitters configured to sample different propagation paths between the transmitter and the receiver array. The method may also include actuating the one or more directional acoustic or ultrasonic transmitters so as to acquire a plurality of waveform data sets at a wellbore depth corresponding to a target subterranean formation zone.

According to at least one aspect of the present disclosure, a system is provided. The system may include an acoustic logging tool having a receiver array and one or more directional acoustic or ultrasonic transmitters configured to sample different propagation paths between the transmitter and the receiver array. The acoustic logging tool may be configured to acquire a plurality of waveform data sets at a wellbore depth corresponding to a target subterranean formation zone adjacent to casing or tubing. The plurality of waveform data sets may include, for example, a first waveform data set corresponding to a first propagation path regime and a second waveform data set corresponding to a second propagation path regime.

The system may also include at least one processor in communication with the acoustic logging tool. The processor may be coupled with a non-transitory computer-readable storage medium having stored therein instructions which, when executed by the at least one processor, causes the at least one processor to determine a total wavefield across the receiver array of the acoustic logging tool at the wellbore depth and generate a Green's function representing each of the first propagation path regime and the second propagation path regime. The instructions may further cause the at least one processor to determine a noise wavefield by convolving the Green's functions and a known transmitted pressure signal corresponding to the first waveform data set and the second waveform data set. The instructions may further cause the at least one processor to generate a reduced-noise wavefield by subtracting the noise wavefield from the total wavefield. In some instances, the instructions may further cause the at least one processor to estimate the formation compressional wave speed for the target subterranean formation zone using the reduced-noise wavefield. In at least some instances, the at least one processor may be disposed in the acoustic logging tool. In other instances, the at least one processor may be located on the surface. In still other cases, the at least one processor may be a plurality of processors that are located both in the wellbore, for example, as part of the acoustic logging tool, and on the surface. In at least some instances, the at least one processor may be disposed in the acoustic logging tool. In other instances, the at least one processor may be located on the surface. In still other cases, the at least one processor may be a plurality of processors that are located both in the wellbore, for example, as part of the acoustic logging tool, and on the surface.

According to at least one aspect of the present disclosure, the system may include an acoustic logging tool that includes a first low-incidence angle directional acoustic transmitter configured to transmit a source waveform such that it impacts the casing or tubing at a low-incidence angle and a second high-incidence angle direction acoustic transmitter configured to transmit a source waveform such that it impacts the casing or tubing at a high-incidence angle. In such instances, the first propagation path regime may be a high-angle of incidence regime and the second propagation path regime may be a low-angle of incidence regime.

FIG. 1 illustrates a diagrammatic view of a logging while drilling (LWD) or measurement while drilling (MWD) wellbore operating environment 100 in which the presently disclosed apparatus, method, and system, may be deployed in accordance with certain exemplary embodiments of the present disclosure. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In at least some cases, the telemetry sub 128 communicates with a surface receiver 130 using mud pulse telemetry. In at least some embodiments, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. Logging tools 126 may include apparatus such as that shown in FIGS. 6-8 such as to perform acoustic (i.e., "sonic") logging. The telemetry sub 128 may include wireless telemetry or logging capabilities, or both, such as to transmit or later provide information indicative of received acoustic energy to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In at least some instances, one or more of the logging tools 126 may communicate with a surface receiver 130, such as wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device 150 on the surface. In some cases, the computing device 150 may be included in surface receiver 130. For example, surface receiver 130 of LWD or MWD wellbore operating environment 100 at the surface may include one or more of wireless telemetry, processor circuitry, or memory facilities, such as to support logging-while-drilling (LWD) or measurement-while-drilling (MWD) operations.

Figure 2:
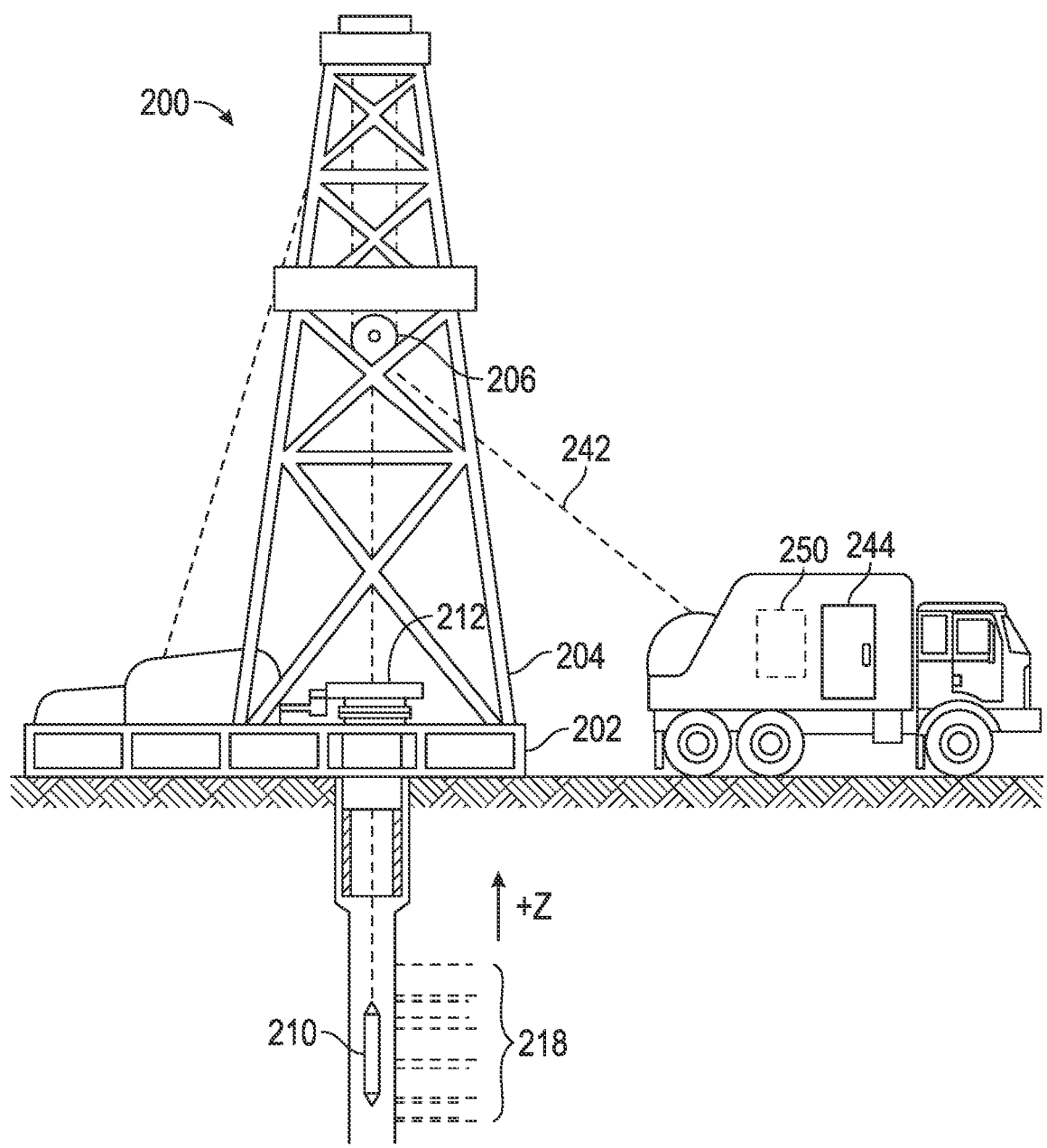
FIG. 2 illustrates a diagrammatic view of a conveyance logging wellbore operating environment in which the presently disclosed apparatus, method, and system, may be deployed, according to an exemplary embodiment of the present disclosure.
Figure 6:
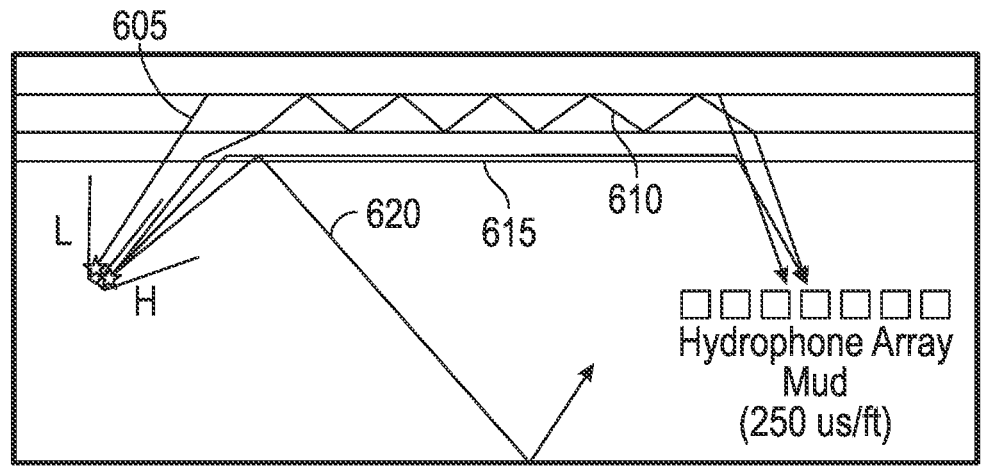
FIG. 6 illustrates the presently disclosed method of eliminating or reducing the interference of the signals of interest by dispersive guided waves by controlling the angle of incidence by which the source waveform impacts the casing using one or more directional transmitters focused at low incidence angles (L) and high incidence angles (H), according to an exemplary embodiment of the present disclosure.
Figure 6:
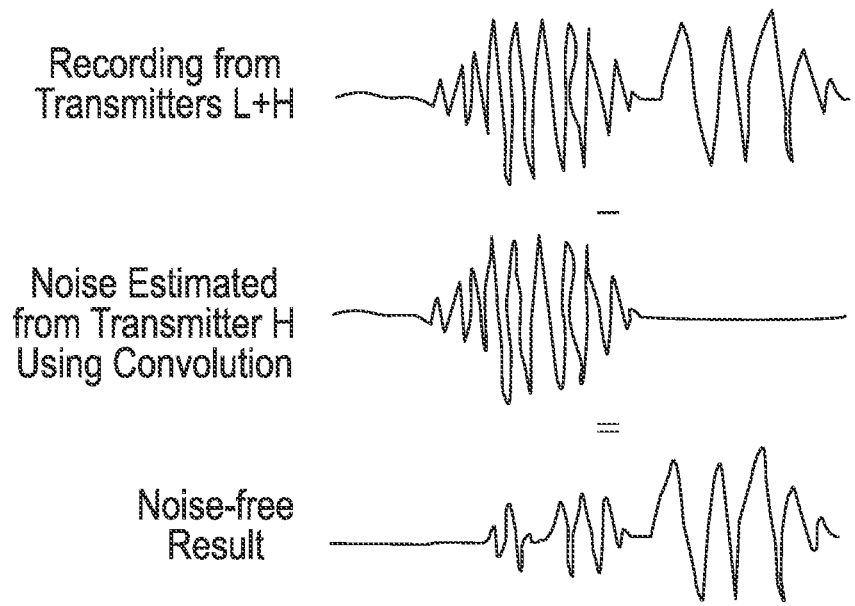
Figure 7:
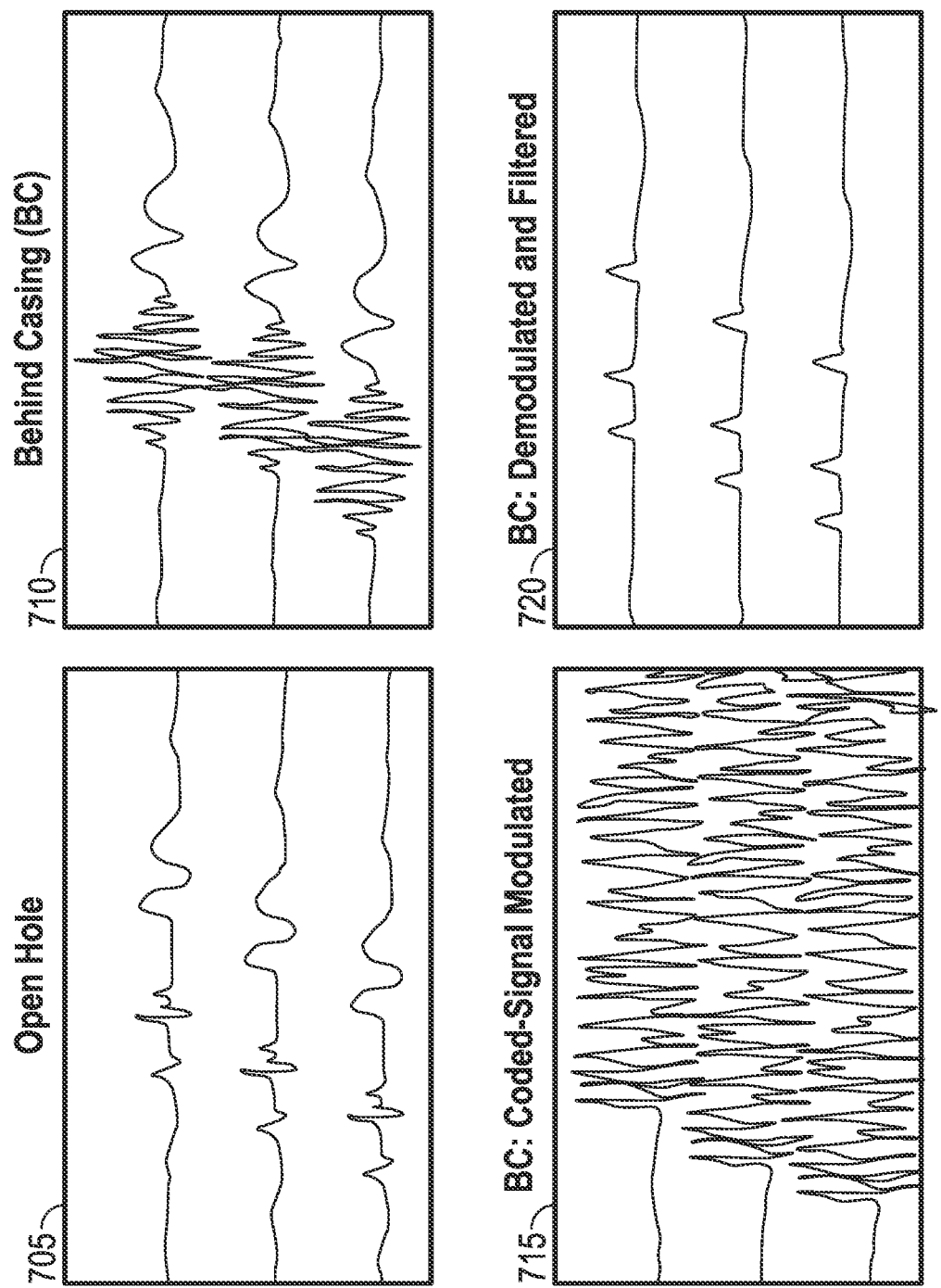
FIG. 7 illustrates the presently disclosed coded signal modulation method for eliminating interference from dispersive wave trains, according to an exemplary embodiment of the present disclosure.

FIG. 2 illustrates a diagrammatic view of a conveyance logging wellbore operating environment 200 in which the presently disclosed apparatus, method, and system, may be deployed in accordance with certain exemplary embodiments of the present disclosure. As depicted in FIG. 2, a hoist 206 may be included as a portion of a platform 202, such as that coupled to derrick 204, and used to raise or lower equipment such as acoustic logging tool 210 into or out of a borehole via conveyance 242 coupled with acoustic logging tool 210. Acoustic logging tool 210 may include, for example, such apparatus as shown in FIGS. 6-8. Conveyance 242 may in some instances provide a communicative coupling between the acoustic logging tool 210 and a logging facility 244 at the surface. The conveyance 242 may be, for example, a mechanical lift, a pipe (e.g., drill pipe), and/or a downhole tractor. Examples of mechanical lift conveyances that may be used include one or more wires, wireline, slickline, coiled tubing, joint tubing, and other tubulars. In some instances, the conveyance 242 may provide power and communication to the acoustic logging tool 210. In other instances, the conveyance 242 may provide only power to the acoustic logging tool 210 or the conveyance may provide only communication to the acoustic logging tool 210. In still other cases, the conveyance 242 may provide neither power nor communication to the acoustic logging tool 210. In such cases, the acoustic logging tool 210 may operate on a remote power source and store data in memory that is read later once the acoustic logging tool 210 is brought to the surface.

The logging facility 244 may include a computing device 250 capable of carrying out the methods and techniques of the present disclosure. In this manner, information about the formation 218 may be obtained by acoustic logging tool 210 and processed by a computing device, such as computing device 250. All or a portion of the information about formation 218 may also be processed by a computing device within acoustic logging tool 210 or by another computer device disposed within the wellbore, such as computing device 150.

Figure 3A:
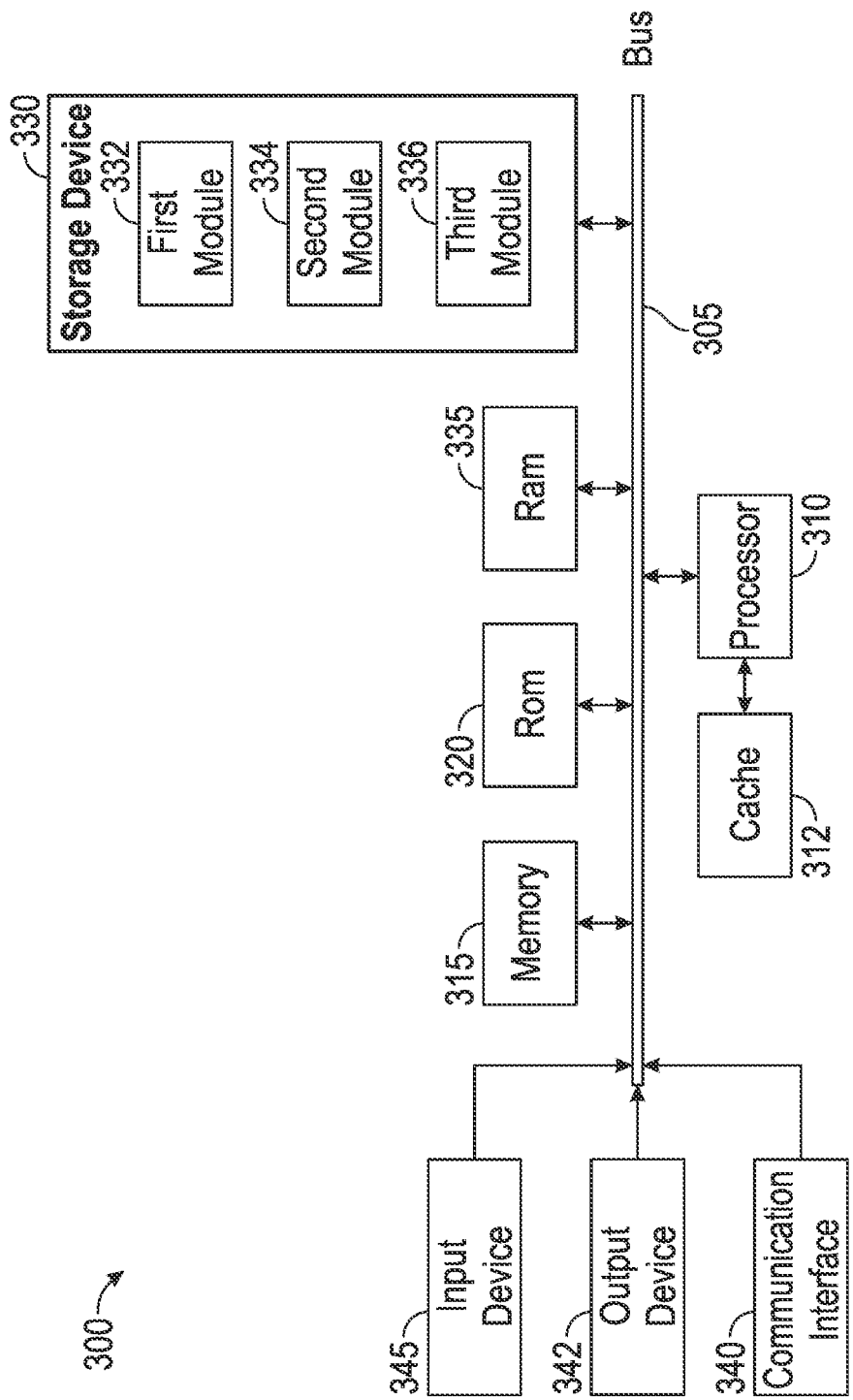
FIG. 3A is an illustration depicting a conventional system bus computing system architecture, according to an exemplary embodiment of the present disclosure.
Figure 3B:
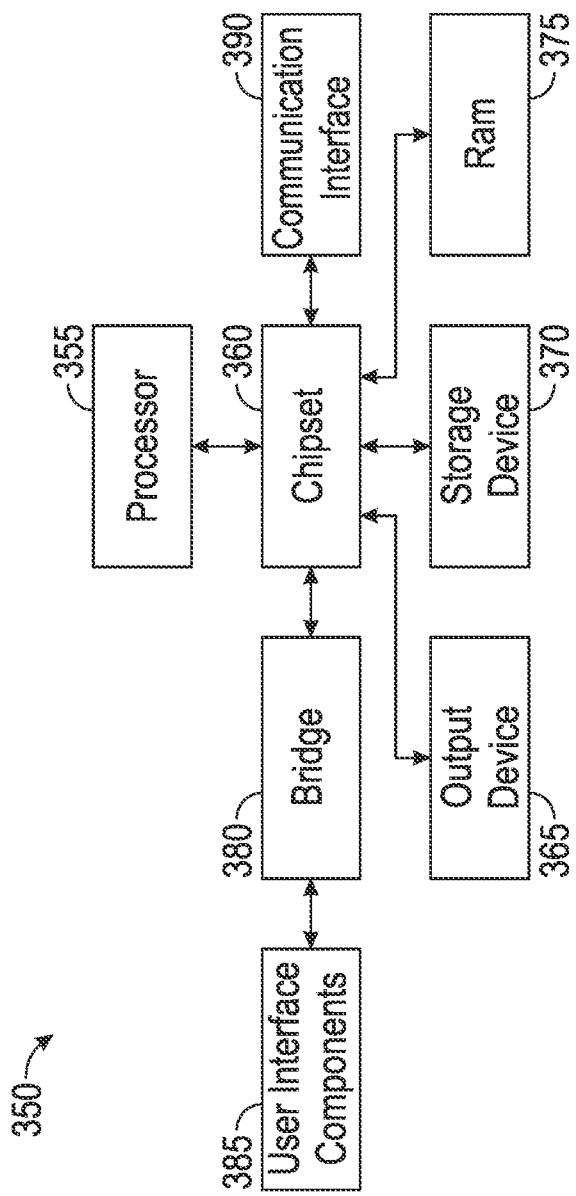
FIG. 3B is an illustration depicting a computer system having a chipset architecture, according to an exemplary embodiment of the present disclosure.

Computing devices, such as computing devices 150, 250 and any computing devices disposed within the wellbore or within the acoustic logging tool 210, may include any suitable computer, controller, or data processing apparatus capable of being programmed to carry out the method, system, and apparatus as further described herein. FIGS. 3A and 3B illustrate exemplary computing device embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as first module 332, second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 335, ROM 320, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors (use of the term "processor" should not be construed to refer exclusively to hardware capable of executing software). Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include the acoustic logging tool itself, as well as laptops, smart phones, small form factor personal computers, personal digital assistants, rackmount devices, stand-alone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in the present disclosure.

Figure 4:
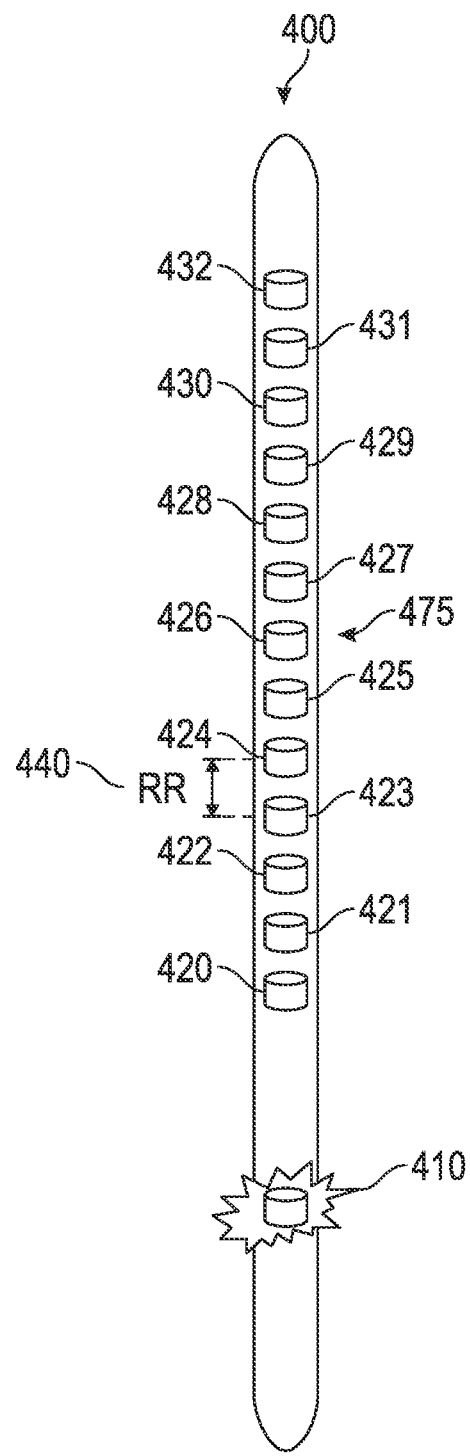
FIG. 4 illustrates a diagrammatic view of an acoustic logging tool capable of performing the presently disclosed methods and techniques, according to an exemplary embodiment of the present disclosure.

FIG. 4 depicts a simplified acoustic logging tool 400 capable of performing the presently disclosed methods and techniques in accordance with certain exemplary embodiments of the present disclosure. As depicted in FIG. 4, the acoustic logging tool 400 includes at least one transmitter 410 capable of exciting acoustic signals of different azimuthal orders. Acoustic logging tool 400 may include any number of transmitters capable of exciting acoustic signals. Acoustic logging tool 400 further includes a receiver array 475. The receiver array 475 may have any number of receivers. For example, receiver array 475 may include 4 receivers or 100 receivers, or any number of receivers therebetween. The receivers in the receiver array 475 may also have any receiver to receiver spacing. For example, the receiver to receiver spacing in receiver array 475 may be from about 0.01 feet (0.015 meters) to about 5 feet (1.5 meters).

As depicted in FIG. 4, acoustic logging tool 400 includes a receiver array comprising thirteen receivers 420-432 with a spacing 440 of 0.5 feet (0.152 meters). As described above, the acoustic logging tool 400 may include any number of transmitters and receiver arrays, having any number of receivers and receiver-receiver spacings, and still be within the spirit and scope of the present disclosure. While FIG. 4 depicts an acoustic logging tool having one transmitter and thirteen receivers, acoustic logging tool 400 may include any number of transmitters and receivers. For example, acoustic logging tool 400 may include an array of 48 receivers. The exemplary depicted receiver array in FIG. 4 is capable of capturing an acoustic wave field of different azimuthal orders. In at least some instances, the acoustic logging tool 400 may be a large-span receiver array. While FIG. 4 depicts an acoustic logging tool having one transmitter and thirteen receivers, acoustic logging tool 400 may include any number of transmitters and receivers. For example, acoustic logging tool 400 may include an array of 48 receivers or an array of ten or less receivers. According to at least one aspect of the present disclosure, transmitter 410 of acoustic logging tool 400 comprises one or more acoustic or ultrasonic directional transmitters configured to sample different propagation paths between the transmitter source and the array of acoustic receivers. In other instances, transmitter 410 of acoustic logging tool 400 comprises a first low-incidence angle directional acoustic transmitter (L) configured to transmit a source waveform such that it impacts the casing or tubing at a low-incidence angle and a second high-incidence angle direction acoustic transmitter (H) configured to transmit a source waveform such that it impacts the casing or tubing at a high-incidence angle, as shown in FIG. 6.

Transmitter 410 of acoustic logging tool 400 may be an ultrasonic transmitter configured to transmit a source wave at ultrasonic frequencies greater than about 20 KHz, or a broadband transmitter configured to transmit a source wave at acoustic frequencies of from about 20 Hz to about 20 KHz and ultrasonic frequencies greater than 20 KHz, or an ultrasonic transmitter configured to transmit a source wave at an ultrasonic frequency range of from about 50 kHz to about 200 kHz. In some instances, transmitter 410 of acoustic logging tool 400 may be a narrow-beam transmitter configured to perform a sweep of firings through a range of incidence angles.

Figure 5A:
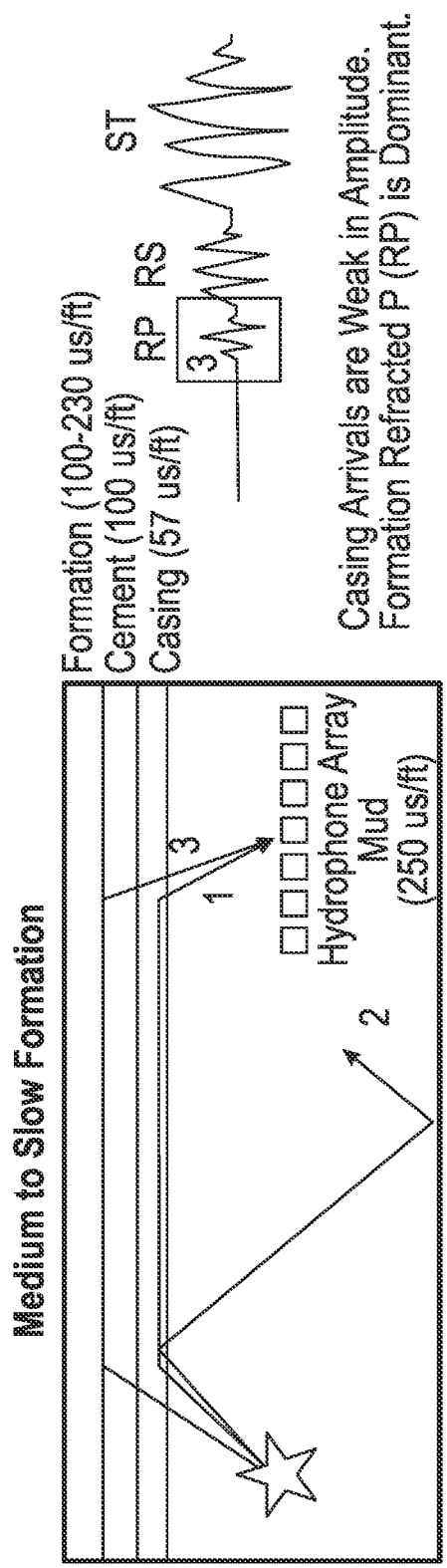
FIG. 5A illustrates a diagrammatic view of the challenges of detecting refracted compressional waves (RP) in a cased wellbore when there is good bonding between the casing and the formation, according to an exemplary embodiment of the present disclosure.
Figure 5B:
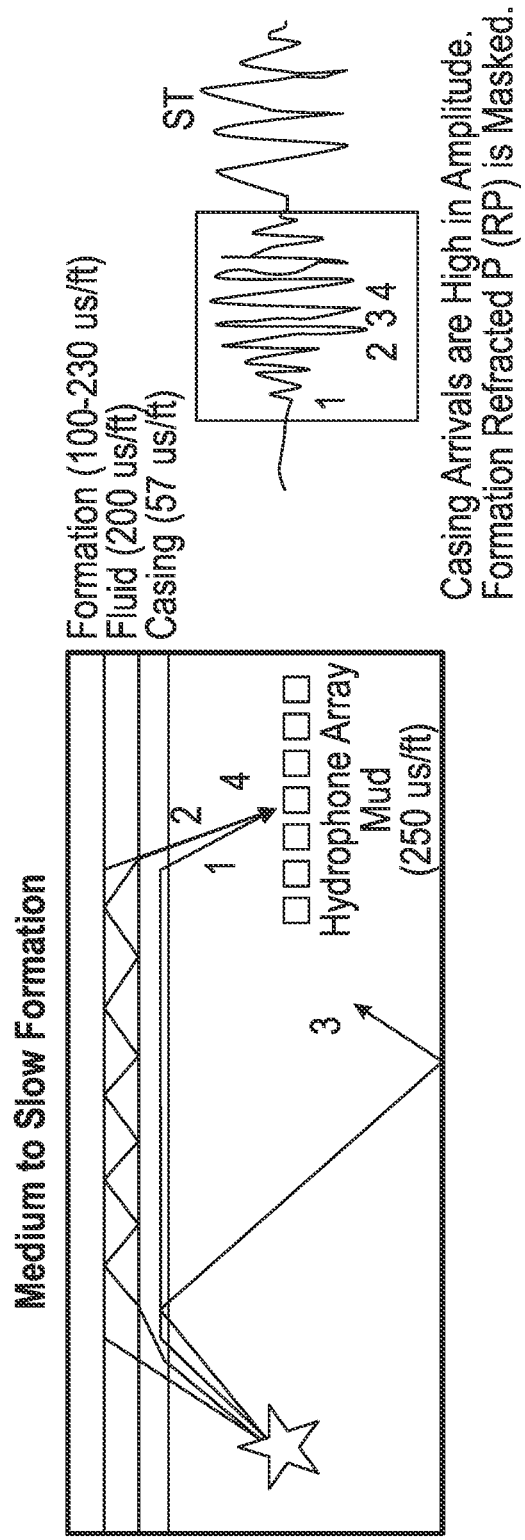
FIG. 5B illustrates a diagrammatic view of the challenges of detecting refracted compressional waves (RP) in a cased wellbore when there is poor bonding between the casing and the formation, according to an exemplary embodiment of the present disclosure.

The measurement of compressional wave speeds after a well is cased is challenging. In a cased hole there are two general scenarios, as depicted in FIG. 5. FIG. 5A depicts the case in which cement bonding is good resulting in cement being between the casing and the formation while FIG. 5B depicts the case in which the cement bonding is poor and there is a fluid-filled gap in the cement between the casing and the formation. In both scenarios, there are internal waves created by reflections of the transmitted signal by the casing. The casing refraction is the ray associated with the critical angle from Snell's Law. The rays at shallower grazing angles past the critical angle never transmit energy into the formation. For rays at greater angles before the critical angle, energy is leaked out into the formation with every reflection.

For the case in which there is good cement bonding and there is cement between the casing and formation, as depicted in FIG. 5A, internal reflections have weak amplitudes. As a result, the refracted wavefield associated with the critical angle between the cement and formation is the dominant first arriving signal. When the cement bonding is poor and there is a fluid-filled gap between the casing and the formation as depicted in FIG. 5B, the gap results in high-amplitude total internally reflected waves from both inside the casing as well as inside the fluid-filled gap. These waves manifest as long wavetrains following the compressional refracted casing arrivals. The wavetrains are long in duration and mask the formation refracted compressional and shear wavefields, limiting the ability to measure the formation compressional and shear velocities, respectively.

As depicted in FIG. 6, directional transmitters can be utilized to control the angle of incidence by which the source waveform impacts the casing thereby controlling the propagation path of the majority of the transmitted energy. In the example shown in FIG. 5, the ray paths that are masking the refracted compressional wave field are those associated with incidence angles that are greater than the critical angle of the formation refraction. However, as depicted in FIG. 6, the interference of the signals of interest by dispersive guided waves can be eliminated or reduced by controlling the angle of incidence by which the source waveform impacts the casing using one or more directional transmitters that are focused at low incidence angles (L) and high incidence angles (H). It is expected that ray theory will be particularly valid throughout most of the propagation path if ultrasonic frequencies are used.

According to at least one aspect of the present disclosure, the presently disclosed methods may include focusing an ultrasonic or acoustic transmitter in different directions to sample different propagation paths between the transmitter source and an array of acoustic receivers, typically hydrophones. In at least some instances, the transmitter may be tuned to ultrasonic (>20 KHz) frequencies, rather than acoustic (20 Hz to 20 KHz) frequencies. In other cases, an acoustic source (20 Hz to 20 KHz) may be used. In still other instances, a broadband source capable of transmitting at both acoustic and ultrasonic frequencies may be desirable. The Green's functions representing each of the different propagation path regimes may be obtained by deconvolving the transmitted pressure signal from each recording. Once the Green's functions associated with the propagation paths of interest are obtained, the transmitter source may be refocused to sample the entire propagation medium to obtain the recorded total wavefield. The previously measured Green's functions may then be convolved with the known transmitted pressure signal and used to estimate the "noise wave field". This noise wavefield may then be subtracted from the total wavefield to obtain a reduced-noise wavefield associated with the refracted compressional wave transiting the formation. The noise wavefield masks the formation refracted compressional wavefield, therefore subtracting the noise wavefield from the total recorded wavefield provides a method of ultimately determining the apparent acoustic velocity of the formation. As used herein, the term "noise wavefield" refers to any portion of the total wavefield not sampling the formation. The formation compressional wave speed can then be estimated based on the reduced-noise wavefield. Accordingly, the presently disclosed methods provide the apparent acoustic velocity of the formation which is simply the apparent acoustic velocity of the refracted wavefield across the receiver array.

The presently disclosed methods may include the use of one or more directional acoustic or ultrasonic transmitters that sample at least two different propagation path regimes in the propagation environment. For instance, FIG. 6 depicts the use of an acoustic logging tool that includes a low-incidence angle transmitter (L) and a high-incidence angle transmitter (H). The low-incidence angle transmitter (L) injects most of its energy into the formation arrivals, which includes the compressional and shear refraction which is approximated by the ray path 605 in FIG. 6. The high-incidence angle transmitter (H) injects most of its energy into the casing arrivals, which are illustrated as rays 610, 615, and 620 in FIG. 6. In at least some instances, the acoustic logging tool does not need to stop during each firing.

In at least some instances, the method may include a first firing using both transmitters L and H simultaneously, where L is focused at low incidence angles and H is focused at high incidence angles. In at least some cases, the source may have programmable electronics so various drive pulses can be selected and used, depending on the environment of implementation. For the first firing, a short, impulsive drive pulse may be used, enabling the total wavefield across the receiver array to be recorded. Use of the short drive pulse provides for good temporal resolution of different arrivals. A second firing may then be used to record the noise field by using a longer drive pulse and only firing the H transmitter. A deconvolution signal processing technique may then be used to estimate the Green's function along the propagation paths associated with transmitter H. Then, the Green's function may be convolved with the transmitted pressure trace from the impulsive drive pulse to compute the noise field. The drive pulse for the H transmitter is much longer than that used for the total wavefield firing because it improves the accuracy of the computed Green's function. Finally, the noise field may be subtracted from the total wavefield to provide a reduced-noise wavefield that is equivalent or nearly equivalent to the wavefield that one would have recorded in an open-hole environment where no casing is present.

Mathematically, the recorded total wavefield $R_T(t)$ from the first firing can be approximated as the summation of the wavefields associated with propagation paths starting at transmitters L and H:

$$R_T(t)=R_S(t)+R_N(t) \qquad (1)$$

where $R_S(t)$ is the recorded signal of interest as a function of time t, and $R_N(t)$ is the recorded noise resulting from propagation along paths 610, 615, and 620 in FIG. 6. This can be re-written in the frequency domain as:

$$R_T(f)=S(f)G_L(f)+S(f)G_H(f) \qquad (2)$$

where $S(f)$ is the source function, and $G_L(f)$ and $G_H(f)$ are the Green's functions that describe the two different propagation regimes, L and H.

We can estimate the Green's function associated with the noise by applying deconvolution to the recording from the second firing used to record the noise field:

$$G_H^*(f) = \frac{R_N(f)}{S_N(f)} \qquad (3)$$

where $R_N(f)$ is the recording of the second firing using the longer drive pulse $S_N(f)$. Deconvolution is a sensitive process and a suitable method should be applied for this Green's function estimation. Iterative deconvolution is one method that provides a generally robust answer that avoids the problem of zeros in the denominator $S_N(f)$.

It should be noted that $G_H^*(f)$ will likely include a minor amount of formation properties. So there will likely be some degradation of the formation arrivals. The amount of degradation will be dependent on how far the critical angle is from the incidence angle that separates the two transmitter ranges, which is dependent on the geometry and environmental parameters such as mud slowness and formation compressional slowness. The amount of signal captured in $G_H^*(f)$ will also be dependent on how applicable ray theory is to the scale of the variations in slowness along the propagation paths. In at least some instances, the presently disclosed method includes using an acoustic logging tool having a transmitter source that transmits in the ultrasonic frequency range from about 50 kHz to about 200 kHz.

The second firing noise field of equation (2) may be subtracted from the recorded total wavefield and brought back to the time domain according to:

$$R_S(t)=F^{-1}\{R_T(f)-S(f)G_H{}^*(f)\} \quad (4)$$

where $F^{-1}$ is the inverse Fourier transform.

This method assumes that the L transmitter is pointing along the angle of incidence for those propagation paths that generate the maximum amount of noise. A natural alternative method is to only fire the H transmitter to sample the formation, and assume that any energy that leaks from the H transmitter into the propagation paths associated with the L transmitter is insignificant and can be handled without a problem.

There may be some environmental conditions where the fixed positions are not the optimal positions. This would result in residual noise after the removal of the computed noise wavefield. In order to avoid this potential issue, an acoustic logging tool having a narrow-focus transducer mounted on a motor that changes the incidence angle during a sweep of a pre-programmed sequence of drive pulse firings may be used. Such a sonic logging tool may perform a sweep of firings through a range of incidence angles of interest thereby sampling and measuring formation apparent slownesses associated with different propagation paths while permitting the reduction in interference from dispersive waves. Each firing may be processed separately and a map of signal coherence as a function of time and velocity may be generated. For more precise post-processing work or where cloud computing resources are available in near-real-time, these maps can be further subdivided into different frequency bands. For example, one can generate 10 time semblance maps for 10 different frequency ranges between 10 and 100 kHz. Each map may be processed and machine learning may be used to pick arrivals of interest. The arrivals may be synthesized at the end of the sweep and physics-guided machine learning may be used to classify the different arrivals.

The narrow focus method described above prevents some dispersive guided wave nodes from being excited. However, the ray paths associated with some guided waves will still be ensonified. Because of the narrow focus, these guided waves will not appear dispersive in the recorded waveforms. Sometimes the dispersive nature of the arrivals is an important criterion to use for identification of the interfering arrivals. An alternative method according to the present disclosure that capitalizes on the dispersive nature of the noise is to use a single wide-focus transmitter (transducer) pointing toward a high incidence angle. The drive pulse used to drive the transmitter (transducer) may then be modulated with a coded signal. Such coded signals may be generated using any carrier frequency of interest. These coded signals have the property of being random such that the auto-correlation only has a peak at 0 time lag. The longer these coded signals are in time, the more spiked the autocorrelation becomes.

The recordings from this firing will look like random noise. However, if the coded signal from the recordings is demodulated, spikes result at the travel times associated with the arrival of non-dispersive arrivals. The signal-to-noise ratio of these spikes is proportional to their coherence and the length of the drive pulse. Both dispersive (associated with total internal reflections, leaky P, and radial gradients) and non-dispersive refracted modes are generated and return to the receiver array. In particular, dispersed waves such as those associated with (1) total internal reflections within the borehole, cement voids, or along waveguides between multiple strings of casing (2) formation radial gradients, or (3) leaky P modes in slow formations would not be coherent with the original coded signal, and they consequently would not be detectable above the noise floor in the resulting demodulated recordings. Then the recordings may be demodulated using the known modulation code. Impulse responses may be generated in the demodulated recordings at the times corresponding to the arrival times of the non-dispersed refracted waves of interest. The dispersive wave trains may be attenuated away during the demodulation process because the coded signal is modified by dispersion.

The demodulation process can be performed in many ways as depicted in FIG. 7. There are three basic methods: deconvolution, cross-correlation (matched filter), or phase-only filtering. One should use deconvolution only when the signal-to-noise ratio (SNR) is very high, which yields the best temporal resolution. One should use cross-correlation only when the SNR is low, which yields the least temporal resolution. Phase-only filtering may be used when a compromise between temporal resolution and required SNR is sought. The demodulated recordings can be further convolved with filters in order to generate waveforms that can be optimally processed via semblance.

FIG. 7 illustrates the presently disclosed coded signal modulation method for eliminating interference from dispersive wave trains. In 705, the open hole case is depicted showing non-dispersive compressional and refracted shear arrivals of interest bearing formation property information. In 710, the behind casing (BC) scenario is depicted showing interference from dispersive arrivals from the presence of one or more casing strings. At 715, the behind casing (BC) coded-signal modulated case is depicted which once demodulated and filtered, as shown in 720, results in the removal of the interfering arrivals and only relatively non-dispersive arrivals remaining.

The presently disclosed coded signal demodulation method has the potential to not only detect the formation refraction behind one string of casing and tubing, but may also be effective to detect the formation acoustic velocity behind multiple strings of casing and tubing as depicted in FIG. 8. This may be achieved by increasing the signal-to-noise ration processing gain as needed by making the signal-coded drive pulse longer in time.

Numerous examples are provided herein to enhance understanding of the present disclosure. A specific set of statements are provided as follows.

Statement 1: A method of determining acoustic velocity behind casing or tubing in a subterranean wellbore, the method comprising: obtaining, using an acoustic logging tool, a plurality of waveform data sets at a wellbore depth corresponding to a target subterranean formation zone, wherein the plurality of waveform data sets comprises a first waveform data set corresponding to a first propagation path regime and a second waveform data set corresponding to a second propagation path regime; obtaining, using the acoustic logging tool, a total wavefield across the receiver array of the acoustic logging tool at the wellbore depth; determining a Green's function representing each of the first propagation path regime and the second propagation path regime; determining a noise wavefield by convolving the Green's functions and a known transmitted pressure signal corresponding to the first waveform data set and the second waveform data set; and generating a reduced-noise wavefield by subtracting the noise wavefield from the total wavefield.

Statement 2: A method according to Statement 1, wherein the reduced-noise wavefield corresponds to a wavefield associated with the refracted compressional wave transiting the target subterranean formation zone.

Statement 3: A method according to Statement 1 or Statement 2, further comprising estimating, using the reduced-noise wavefield, the formation compressional wave speed for the target subterranean formation zone.

Statement 4: A method according to any one of the preceding Statements 1-3, wherein the acoustic logging tool comprises one or more acoustic or ultrasonic transmitters configured to sample different propagation paths between the transmitter source and an array of acoustic receivers.

Statement 5: A method according to an one of the preceding Statements 1-4, wherein determining the Green's functions comprises deconvolving a known transmitted pressure signal from the recording of the first waveform data set and the second waveform data set.

Statement 6: A method according to any one of the preceding Statements 1-5, wherein the first propagation path regime comprises a high-angle of incidence regime and the second propagation path regime comprises a low-angle of incidence regime.

Statement 7: A method according to Statement 6, wherein the acoustic logging tool comprises a first low-incidence angle directional acoustic transmitter configured to transmit a source waveform such that it impacts the casing or tubing at a low-incidence angle and a second high-incidence angle direction acoustic transmitter configured to transmit a source waveform such that it impacts the casing or tubing at a high-incidence angle.

Statement 8: A method according to Statement 7, wherein obtaining a total wavefield comprises firing the first low-incidence angle directional acoustic transmitter and the second high-incidence angle directional acoustic transmitter simultaneously.

Statement 9: A method according to Statement 7, further comprising: firing simultaneously the first low-incidence angle directional acoustic transmitter and the second high-incidence angle directional acoustic transmitter using a short impulse drive pulse to obtain a total wavefield; and firing the second high-incidence angle directional acoustic transmitter using a longer drive pulse to obtain a second waveform data set corresponding to the high-angle of incidence regime; wherein determining the Green's functions comprises applying deconvolution to the second waveform data set.

Statement 10: A method according to any one of the preceding Statements 1-9, wherein the acoustic logging tool comprises an ultrasonic transmitter configured to transmit a source wave at ultrasonic frequencies greater than about 20 KHz.

Statement 11: A method according to any one of the preceding Statements 1-10, wherein the acoustic logging tool comprises a broadband transmitter configured to transmit a source wave at acoustic frequencies of from about 20 Hz to about 20 KHz and ultrasonic frequencies greater than 20 KHz.

Statement 12: A method according to any one of the preceding Statements 1-11, further comprising: disposing an acoustic logging tool in a subterranean wellbore comprising casing or tubing, the acoustic logging tool having a receiver array and one or more directional acoustic or ultrasonic transmitters configured to sample different propagation paths between the transmitter and the receiver array; and actuating the one or more directional acoustic or ultrasonic transmitters so as to acquire a plurality of waveform data sets at a wellbore depth corresponding to a target subterranean formation zone.

Statement 13: A method according to Statement 12, wherein the acoustic logging tool is lowered to a wellbore depth corresponding to a cased portion of the wellbore or adjacent to tubing.

Statement 14: A method according to any one of the preceding Statements 1-13, wherein the acoustic logging tool comprises a narrow-beam transmitter configured to perform a sweep of firings through a range of incidence angles.

Statement 15: A method according to any one of the preceding Statements 1-14, wherein the a plurality of waveform data sets and the total wavefield are obtained using an acoustic logging tool having a transmitter configured to transmit in the ultrasonic frequency range of from about 50 kHz to about 200 kHz.

Statement 16: A system comprising: an acoustic logging tool having a receiver array and one or more directional acoustic or ultrasonic transmitters configured to sample different propagation paths between the transmitter and the receiver array, the acoustic logging tool configured to acquire a plurality of waveform data sets at a wellbore depth corresponding to a target subterranean formation zone adjacent to casing or tubing, wherein the plurality of waveform data sets comprises a first waveform data set corresponding to a first propagation path regime and a second waveform data set corresponding to a second propagation path regime; at least one processor in communication with the acoustic logging tool, wherein the processor is coupled with a non-transitory computer-readable storage medium having stored therein instructions which, when executed by the at least one processor, causes the at least one processor to: determine a total wavefield across the receiver array of the acoustic logging tool at the wellbore depth; generate a Green's function representing each of the first propagation path regime and the second propagation path regime; determine a noise wavefield by convolving the Green's functions and a known transmitted pressure signal corresponding to the first waveform data set and the second waveform data set; and generate a reduced-noise wavefield by subtracting the noise wavefield from the total wavefield.

Statement 17: A system according to Statement 16, wherein the non-transitory computer-readable storage medium further contains a set of instructions that when executed by the at least one processor, further causes the at least one processor to estimate, using the reduced-noise wavefield, the formation compressional wave speed for the target subterranean formation zone.

Statement 18: A system according to Statement 16 or Statement 17, wherein the acoustic logging tool comprises a first low-incidence angle directional acoustic transmitter configured to transmit a source waveform such that it impacts the casing or tubing at a low-incidence angle and a second high-incidence angle direction acoustic transmitter configured to transmit a source waveform such that it impacts the casing or tubing at a high-incidence angle; and wherein the first propagation path regime comprises a high-angle of incidence regime and the second propagation path regime comprises a low-angle of incidence regime.

Statement 19: A system according to any one of the preceding Statements 16-18, wherein the acoustic logging tool comprises at least one ultrasonic transmitter configured to transmit a source wave at ultrasonic frequencies greater than about 20 KHz.

Statement 20: A system according to any one of the preceding Statements 16-19, wherein the acoustic logging tool comprises at least one broadband transmitter configured to transmit a source wave at acoustic frequencies of from about 20 Hz to about 20 KHz and ultrasonic frequencies greater than 20 KHz.

Statement 21: A system according to any one of the preceding Statements 16-20, wherein the acoustic logging tool comprises at least one narrow-beam transmitter configured to perform a sweep of firings through a range of incidence angles.

We claim:

1. A method of determining acoustic velocity behind casing or tubing in a subterranean wellbore, the method comprising:
    obtaining, using an acoustic logging tool at a wellbore depth corresponding to a target subterranean formation zone, a plurality of waveform data sets, the plurality of waveform data sets comprises a first waveform data set corresponding to a first propagation path regime and a second waveform data set corresponding to a second propagation path regime;
    obtaining, using the acoustic logging tool, a total wavefield across a receiver array of the acoustic logging tool at the wellbore depth;
    determining a first Green's function based on the first waveform data set and a second Green's function based on the second waveform data set, the first Green's function representing the first propagation path regime and the second Green's function representing the second propagation path regime;
    determining a noise wavefield by convolving the first Green's function, the second Green's function, a known transmitted pressure signal corresponding to the first waveform data set and a known transmitted pressure signal corresponding to the second waveform data set; and
    generating a reduced-noise wavefield by subtracting the noise wavefield from the total wavefield.

2. The method according to claim 1, wherein the reduced-noise wavefield corresponds to a wavefield associated with a refracted compressional wave transiting the target subterranean formation zone.

3. The method according to claim 1, further comprising estimating, using the reduced-noise wavefield, a formation compressional wave speed for the target subterranean formation zone.

4. The method according to claim 1, wherein the acoustic logging tool comprises one or more acoustic or ultrasonic transmitters configured to sample different propagation paths between a transmitter source and an array of acoustic receivers.

5. The method according to claim 1, wherein determining the first Green's function and the second Green's function further comprises deconvolving a known transmitted pressure signal from a recording of the first waveform data set and the second waveform data set.

6. The method according to claim 1, wherein the first propagation path regime comprises a high-angle of incidence regime and the second propagation path regime comprises a low-angle of incidence regime.

7. The method according to claim 6, wherein the acoustic logging tool comprises a first low-incidence angle directional acoustic transmitter configured to transmit a source waveform such that it impacts the casing or tubing at a low-incidence angle and a second high-incidence angle directional acoustic transmitter configured to transmit a source waveform such that it impacts the casing or tubing at a high-incidence angle.

8. The method according to claim 7, wherein obtaining a total wavefield comprises firing the first low-incidence angle directional acoustic transmitter and the second high-incidence angle directional acoustic transmitter simultaneously.

9. The method according to claim 7, further comprising:
    firing simultaneously the first low-incidence angle directional acoustic transmitter and the second high-incidence angle directional acoustic transmitter using a short impulse drive pulse to obtain a total wavefield; and
    firing the second high-incidence angle directional acoustic transmitter using a longer drive pulse to obtain a second waveform data set corresponding to the high-angle of incidence regime;
    wherein determining the second Green's functions comprises applying deconvolution to the second waveform data set.

10. The method according to claim 1, wherein the acoustic logging tool comprises an ultrasonic transmitter configured to transmit a source wave at ultrasonic frequencies greater than about 20 KHz.

11. The method according to claim 1, wherein the acoustic logging tool comprises a broadband transmitter configured to transmit a source wave at acoustic frequencies of from about 20 Hz to about 20 KHz and ultrasonic frequencies greater than 20 KHz.

12. The method according to claim 1, further comprising:
    disposing an acoustic logging tool in a subterranean wellbore comprising casing or tubing, the acoustic logging tool having a receiver array and one or more directional acoustic or ultrasonic transmitters configured to sample different propagation paths between the one or more directional acoustic or ultrasonic transmitters and the receiver array; and
    actuating the one or more directional acoustic or ultrasonic transmitters so as to acquire a plurality of waveform data sets at a wellbore depth corresponding to a target subterranean formation zone.

13. The method according to claim 12, wherein the acoustic logging tool is lowered to a wellbore depth corresponding to a cased portion of the wellbore or adjacent to tubing.

14. The method according to claim 1, wherein the acoustic logging tool comprises a narrow-beam transmitter configured to perform a sweep of firings through a range of incidence angles.

15. The method according to claim 1, wherein the plurality of waveform data sets and the total wavefield are obtained using an acoustic logging tool having a transmitter configured to transmit in an ultrasonic frequency range of from about 50 kHz to about 200 kHz.

16. A system comprising:
    an acoustic logging tool having a receiver array and one or more directional acoustic or ultrasonic transmitters configured to sample different propagation paths between the one or more directional acoustic or ultrasonic transmitters and the receiver array, the acoustic logging tool configured to acquire a plurality of waveform data sets at a wellbore depth corresponding to a target subterranean formation zone adjacent to casing or tubing, wherein the plurality of waveform data sets comprises a first waveform data set corresponding to a first propagation path regime and a second waveform data set corresponding to a second propagation path regime;

at least one processor in communication with the acoustic logging tool, wherein the at least one processor is coupled with a non-transitory computer-readable storage medium having stored therein instructions which, when executed by the at least one processor, causes the at least one processor to:

determine a total wavefield across the receiver array of the acoustic logging tool at the wellbore depth;

generate a first Green's function based on the first waveform data set and a second Green's function based on the second waveform data set, the first Green's function representing the first propagation path regime and the second Green's function representing the second propagation path regime;

determine a noise wavefield by convolving the first Green's function, the second Green's function, a known transmitted pressure signal corresponding to the first waveform data set and a known transmitted pressure signal corresponding to the second waveform data set; and generate a reduced-noise wavefield by subtracting the noise wavefield from the total wavefield.

17. The system according to claim 16, wherein the non-transitory computer-readable storage medium further contains a set of instructions that when executed by the at least one processor, further causes the at least one processor to estimate, using the reduced-noise wavefield, a formation compressional wave speed for the target subterranean formation zone.

18. The system according to claim 17, wherein the acoustic logging tool comprises a first low-incidence angle directional acoustic transmitter configured to transmit a source waveform such that it impacts the casing or tubing at a low-incidence angle and a second high-incidence angle direction acoustic transmitter configured to transmit a source waveform such that it impacts the casing or tubing at a high-incidence angle; and wherein the first propagation path regime comprises a high-angle of incidence regime and the second propagation path regime comprises a low-angle of incidence regime.

19. The system according to claim 16, wherein the acoustic logging tool comprises at least one ultrasonic transmitter configured to transmit a source wave at ultrasonic frequencies greater than about 20 KHz.

20. The system according to claim 16, wherein the acoustic logging tool comprises at least one broadband transmitter configured to transmit a source wave at acoustic frequencies of from about 20 Hz to about 20 KHz and ultrasonic frequencies greater than 20 KHz.

* * * * *